F. R. LEWIS.
LANDING NET.
APPLICATION FILED JULY 30, 1919.
1,391,841. Patented Sept. 27, 1921.
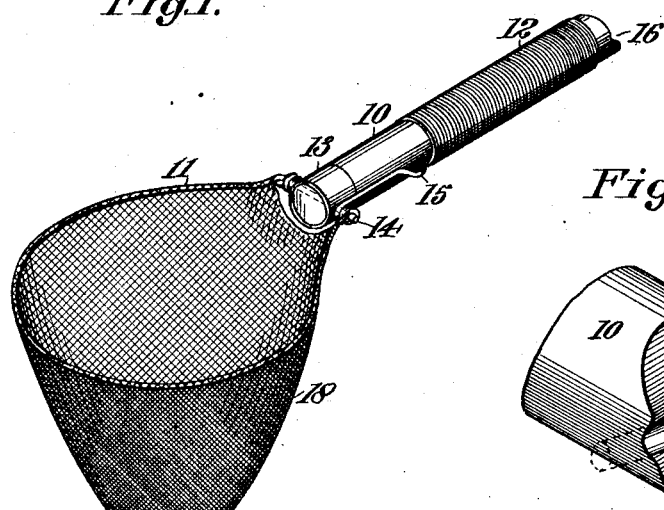
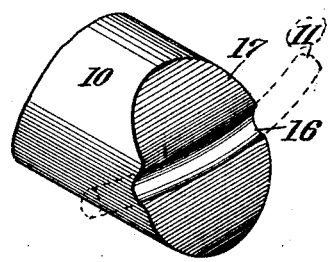
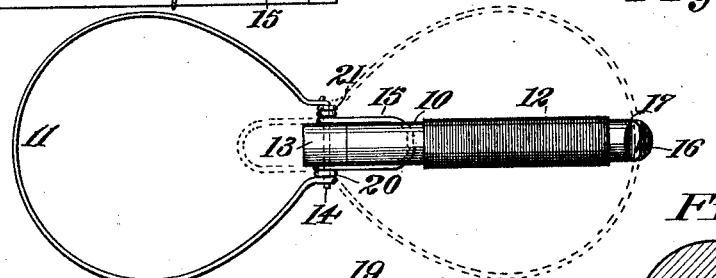
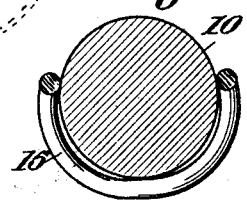
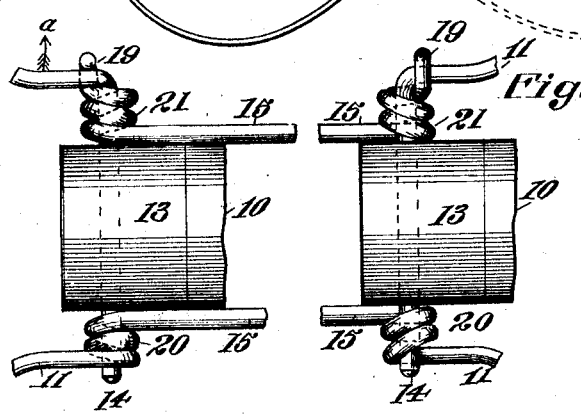
INVENTOR
Frank R. Lewis.
BY
Strong & Townsend
ATTORNEYS

UNITED STATES PATENT OFFICE.

FRANK R. LEWIS, OF SAN FRANCISCO, CALIFORNIA.

LANDING-NET.

1,391,841.  Specification of Letters Patent.  Patented Sept. 27, 1921.

Application filed July 30, 1919.  Serial No. 314,216.

*To all whom it may concern:*

Be it known that FRANK R. LEWIS, a citizen of the United States, residing at the city and county of San Francisco and State of California, has invented new and useful Improvements in Landing-Nets, of which the following is a specification.

This invention relates to a landing net and particularly pertains to a foldable device of that class.

It is the principal object of the present invention to provide a landing net suitable for use in fly fishing which structure is decidedly simple in construction and is so designed as to be compactly folded and easily unfolded and placed in condition for use by a single handed manipulation of the operator.

The present invention contemplates the use of a handle to which is detachably secured a hoop for receiving a net, said hoop embodying features in combination with the handle whereby it may be locked in folded relation to the handle or automatically clamped in its operative position.

The invention is illustrated by way of example in the accompanying drawings in which—

Figure 1 is a view in perspective illustrating the present invention as unfolded and in condition for operation;

Fig. 2 is a view in plan illustrating the handle and hoop of the landing net and further disclosing by dotted lines the folded position of the hoop.

Fig. 3 is a view in side elevation showing the locked position of the handle and hoop.

Fig. 4 is a view similar to that shown in Fig. 3 illustrating the handle and hoop as in its unfolded position.

Fig. 5 is an enlarged fragmentary view disclosing pivotal connections between the hoop and the handle as seen from the upper side of the structure.

Fig. 6 is a view similar to Fig. 5 showing the opposite side of the hoop, and handle connection.

Fig. 7 is an enlarged view in transverse section through the handle as seen on the line 7—7 of Fig. 4.

Fig. 8 is an enlarged fragmentary view showing the end of the handle and the locking action taking place between it and the hoop which is indicated by dotted lines.

Referring more particularly to the drawings, 10 indicates a handle here shown as formed of a solid cylindrical member adapted to engage a hoop 11 at one end and further fitted with a handle grip 12 at its opposite end. The hoop is preferably formed of steel spring wire. The outer end of the handle is formed with a ferrule 13 which prevents the handle from splitting and also serves as a bearing for a pivot wire 14. This wire extends transversely through the ferrule and the handle end and is formed as a continuation of one end of the hoop 11 as more clearly shown in Fig. 2. The wire 14 is led around to provide a substantially circular loop and is thereafter formed with a plurality of convolutions to provide a receiving bearing for the terminating end of the portion 14. The wire is then led substantially at right angles to the portion 14 and provides a U shaped locking loop 15 which is adapted to grip the handle 10 in the manner clearly shown in Fig. 7. The free end of the wire leading from the locking loop 15 is then formed with a plurality of convolutions forming a central opening in longitudinal alinement with the opening formed by the convolutions at the opposite side of the loop 15 and through both sets of convolutions the pivot member 14 extends. The end of the wire is then bent outwardly in the manner shown in Fig. 5 and is turned upwardly to form a hook so that it may snap around the hoop and hold it in locked position upon the handle.

By reference to Figs. 3 and 4 it will be seen that the wire shaped as previously described will form opposite extending portions emanating from the axis of the pivot wire 14 and adapted to swing around this pivot so that the hoop 11 may lie along the opposite sides of the handle 12 or when reversed the lock loop 15 may lie along opposite sides of the handle and frictionally engage the surface thereof to hold the hoop in position substantially in longitudinal alinement with the central axis thereof. This alinement is not absolute, however, as the hoop portion is adapted to extend upwardly and form a slight "spoon". Springing action is afforded by the inherent resiliency of the wire as well as the play permitted by the convolutions of wire around the pivot wire 14 at the opposite sides of the handle.

From the preceding description it will be understood that the loop 15 will act in conjunction with the handle to hold the hoop and handle in its operative positions. In order that the hoop may be easily locked in its folded position, an arcuate groove 16 is formed across the end of the handle 10 and opposite from the end upon which the hoop is pivoted. The contour of this groove is adapted to substantially agree with the formation of the hoop and thus to coöperate therewith in holding the members in fixed relation to each other when the hoop is seated within the groove. In order that this action may be easily performed, and further to insure that the structure may be easily unfolded, an inclined face 17 is formed on the end of the handle and leads toward the edge of the groove, thus permitting the hoop to be gradually distorted and sprung over the edge of the groove and into the seat formed thereby.

In operation the present invention when completely assembled may be suspended by the loop 15 from any suitable fastener upon the garment of the wearer or carried in a pocket provided and due to the small dimensions of the structure when folded may be easily concealed beneath the coat of the wearer so that it will not become entangled in the branches and other shrubbery. When the net is to be used the handle is preferably grasped by one hand with the thumb passed under the handle and into the net, and the fingers of the hand passing over the handle to bear down against the hoop. In this manner a pressure may easily be exerted upon the hoop to swing it downwardly and out of the groove 16. As the hoop springs away a slight snapping action is imparted to the handle to swing the hoop into its operative position and to cause the handle to assume a position between the jaws of the locking loop 15. The hoop will thus be automatically locked in the position shown in Fig. 4 after which the handle may be gripped as convenience dictates.

When the structure is to be folded the handle and net are faced outwardly and a quick snapping action may then be given to the handle to break the joint to cause the hoop to swing through a semi-circle and become seated within the slot 16 at the other end of the handle. The landing net may then be suspended from its fastening or placed in a pocket.

In the event that it is desired to remove the net 18 from the hoop the pivot portion 14 of the wire may be lifted outwardly in the direction of the arrow —a— as indicated in Fig. 5. This action will cause the wire to become disengaged from the fastening end 19 of the hoop and will permit the portion 14 to be withdrawn from the bearing portions 20 and 21 of the hoop and the ferrule 13. When in this position the handle may be completely removed and the net unthreaded from the hoop. This will facilitate in permitting the net to be washed and dried and will make it possible to keep the structure in a clean and sanitary condition or for the purpose of replacing the short handle with a longer one for occasional boat use if desired.

It will thus be seen that the device here disclosed is decidedly simple in its construction and of few parts composed of a handle, a hoop member and the net, said members being easily separable and readily assembled to provide a folding structure adapted to be automatically locked in its opened or closed position.

While I have shown the preferred form of my invention, as now known to me, it will be understood that various changes may be made in the combination, construction and arrangement of parts without departing from the spirit of the invention, as claimed.

Having thus described my invention, what I claim and desire to secure by Letters Patent is:

1. In a device of the character described, a rigid handle, a landing net hoop freely pivoted to one end of said handle, means for bringing the hoop and handle into folded interlocked relation to each other and means embodied within the hoop structure for frictionally engaging the handle and holding the hoop and handle in their unfolded positions to each other.

2. In a device of the character described, a net hoop formed of a continuous piece of wire, a bearing member formed by straightening the wire at one end and passing it through a handle, convolutions formed in the wire to lie along opposite sides of the handle and to provide a bearing through which said straightened portion extends, and a turned portion at the end of one of said convolutions adapted to lock with the wire and hold the straight portion within its bearings.

3. In a device of the character described, a net hoop formed of a single piece of wire to provide a loop upon which a net may be threaded and further formed with a U-shaped continuation thereof for gripping a net-handle, bearing portions formed at opposite ends of said U-shape by convolutions of the single wire intermediate of the U-shaped grip and the net loop and adapted to receive the free ends of said wire as it continues from the loop.

4. In a device of the character described, a net hoop formed of a single piece of wire to provide a loop upon which a net may be threaded and further formed with a U-shaped continuation thereof for gripping a net-handle, bearing portions formed at opposite ends of said U-shape by convolutions of the single wire and adapted to receive the free end of said wire as it passes from the loop, and means formed by the terminating opposite end of the wire for locking said extending portion through the convolutions.

5. In a device of the character described, a handle, a net hoop pivoted upon said handle and formed with a loop to receive a net and a clamping portion adapted to frictionally engage the sides of the handle for locking the net in its open position and locking means on the opposite end of the handle for receiving the hoop portion of the net and holding the same when in its closed position.

6. A landing net comprising a handle, a hoop carried thereby and pivoted to the end of the handle, a landing net supported thereon, means whereby the hoop will frictionally engage the handle to be held in its folded position and other means carried by the hoop for frictionally engaging the handle when the hoop is in its unfolded position.

7. A device of the character described comprising a handle, a net hoop pivoted at one end of said handle, means whereby the hoop may frictionally engage the opposite end of the handle when folded and means formed integral with the hoop for frictionally engaging the body of the handle and automatically locking the hoop and handle in unfolded relation to each other.

In testimony whereof I have hereunto set my hand in the presence of two subscribing witnesses.

FRANK R. LEWIS.

Witnesses:
W. W. HEALEY,
M. E. EWING.